(12) United States Patent
Ozawa

(10) Patent No.: US 8,795,423 B2
(45) Date of Patent: Aug. 5, 2014

(54) INK FOR INKJET RECORDING APPARATUSES, AND METHOD FOR FORMING IMAGE

(71) Applicant: KYOCERA Document Solutions Inc., Osaka (JP)

(72) Inventor: Noriaki Ozawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/688,752

(22) Filed: Nov. 29, 2012

(65) Prior Publication Data

US 2013/0155143 A1  Jun. 20, 2013

(30) Foreign Application Priority Data

Dec. 15, 2011 (JP) .................................. 2011-274871

(51) Int. Cl.
*C09D 11/02* (2014.01)

(52) U.S. Cl.
USPC ........................................ 106/31.86; 347/100

(58) Field of Classification Search
CPC .............................. C09D 11/30; C09D 11/322
USPC ....................................................... 106/31.86
See application file for complete search history.

(56) References Cited

U.S. PATENT DOCUMENTS

| | | | |
|---|---|---|---|
| 2005/0139124 A1* | 6/2005 | Ito et al. ...................... | 106/31.58 |
| 2010/0076150 A1* | 3/2010 | Ikoshi ........................... | 524/555 |

FOREIGN PATENT DOCUMENTS

JP      11-302586 A     11/1999

* cited by examiner

*Primary Examiner* — Veronica F Faison
(74) *Attorney, Agent, or Firm* — Knobbe Martens Olson & Bear LLP

(57) ABSTRACT

An ink for inkjet recording apparatuses is provided in which an adsorbed resin proportion calculated from a total resin mass and a free resin mass in the ink is at least 0.95 and less than 1.00, the ink containing in specific amounts, respectively: water; a pigment dispersion including a resin with a molecular weight in the range of 35,000 to 140,000 and a specific amount of pigment; glycerin and 1,3-propanediol as humectants; and 1,2-octanediol, which has 8 carbon atoms, as a high penetrating agent, and further containing a C2-C4 monoalkyl ether of a polyhydric alcohol as a penetrating agent.

6 Claims, 4 Drawing Sheets

INK FOR INKJET RECORDING APPARATUSES, AND METHOD FOR FORMING IMAGE

REFERENCE TO RELATED APPLICATIONS

This application is based upon and claims the benefit of priority from the corresponding Japanese Patent Application No. 2011-274871, filed in the Japan Patent Office on Dec. 15, 2011, the entire contents of which are incorporated herein by reference.

FIELD

The present disclosure relates to an ink for inkjet recording apparatuses, and a method for forming images.

BACKGROUND

In recent years, inkjet recording apparatuses that form images using an inkjet recording system have been widely used as image forming apparatuses due to obtaining high-definition image quality comparable to silver-halide prints having become possible from rapid advancements in recording technology. For such inkjet recording apparatuses, increased speed in image formation has been demanded. However, in a case of performing image formation at high speed using an inkjet recording apparatus, a recording medium carrying the ink passes between a pair of ejection rollers and is ejected before the ink penetrates the recording medium such as paper. On this occasion, the ink may adhere to the ejection rollers (offsets). In this case, image defects caused by offset come to easily occur in the formed image. In order to suppress the occurrence of offset, it has been considered to decrease the amount of ink ejected. However, if decreasing the amount of ink ejected, it may not be possible to obtain an image of a desired image density.

In view of the above-mentioned situation, as an ink for inkjet recording apparatuses that excels in penetrability to the recording medium and can form a favorable image, a water-based ink has been proposed that is characterized in containing a wetting agent and a pigment dispersion made by dispersing pigment as a coloring agent in water using a resin, and further containing 2-ethyl-1,3-hexanediol.

In the above ink, 2-ethyl-1,3-hexanediol is used as a component for improving the penetrability of the ink into the recording medium. However, with this ink, in a case of the content of 2-ethyl-1,3-hexanediol being small, because the penetrability of the ink into the recording medium cannot be sufficiently raised, and contamination of the recording medium caused by offset may occur. In addition, with this ink, in a case of the content of 2-ethyl-1,3-hexanediol being great, since the penetrability of the ink into the recording medium will be too high, the coloring agent will penetrate inside of the recording medium along with liquid component contained in the ink. There is a problem in that there is a possibility for the image density of the formed image to be less than a desired value if the coloring agent penetrates to inside of the recording medium.

Furthermore, the above ink has a problem in that, depending on the type of wetting agent, in the case of having been left for a long time without the recording head filled with ink being capped, the wetting agent solidifies in the recording head and considerable thickening of the ink occurs, and it is difficult to recover the ejection state of ink droplets to the state prior to being left, even if performing a recovery operation of carrying out purging and wiping on the recording head.

In addition, in a case of using inkjet recording apparatus of a line head-type recording system, which is able to form images at high speed, it is necessary to increase the amount of ink ejected in order to form an image having such a desired image density, since it is not possible to perform overlapped drawing of the image. Furthermore, with the inkjet recording apparatuses of a line head-type recording system using inks of several colors, ink droplets are intermittently ejected from a plurality of heads onto the recording medium moving in the recording apparatus. In such a case, drying of the ink droplets landed on the recording medium from the head progresses in a period until ink droplets are landed from a next head; therefore, penetration of the ink droplets landed from the next head into the recording medium tends to be hindered.

For this reason, in a case of using inkjet recording apparatus of a line head-type recording system, the problem of offset occurrence in particular tends to arise. Therefore, with above-mentioned ink for inkjet recording apparatuses, it is very difficult to balance the suppression of the occurrence of offset and the forming of images having a desired image density in an inkjet recording apparatus of a line head-type recording system.

SUMMARY

An ink for inkjet recording apparatuses according to an aspect of the present disclosure includes at least water, a pigment dispersion, a high penetrating agent, a penetrating agent and a humectant.

The pigment dispersion contains a resin having a molecular weight in the range of 35,000 to 140,000 and a pigment.

An adsorbed resin proportion, obtained using the following formula from the mass of a total amount of the resin in the ink and an amount of resin separated from pigment among the resin, is at least 0.95 and less than 1.00:

adsorbed resin proportion=1−(free resin mass/total resin mass).

The content of the pigment in the ink is in the range of 4% by mass to 9.5% by mass.

The humectant is glycerin and 1,3-propanediol.

The content of glycerin in the ink is at least 5% by mass, and the content of 1,3-propanedial is in the range of 10% by mass to 30% by mass.

The high penetrating agent is 1,2-octanediol.

The content of the high penetrating agent in the ink is in the range of 0.2% by mass to 0.8% by mass.

The penetrating agent is a C2-C4 monoalkyl ether of a polyhydric alcohol.

A method for forming images according to another aspect of the present disclosure forms an image using an inkjet recording apparatus, using the aforementioned ink for inkjet recording apparatuses.

DETAILED DESCRIPTION OF EMBODIMENTS

Figure 1:
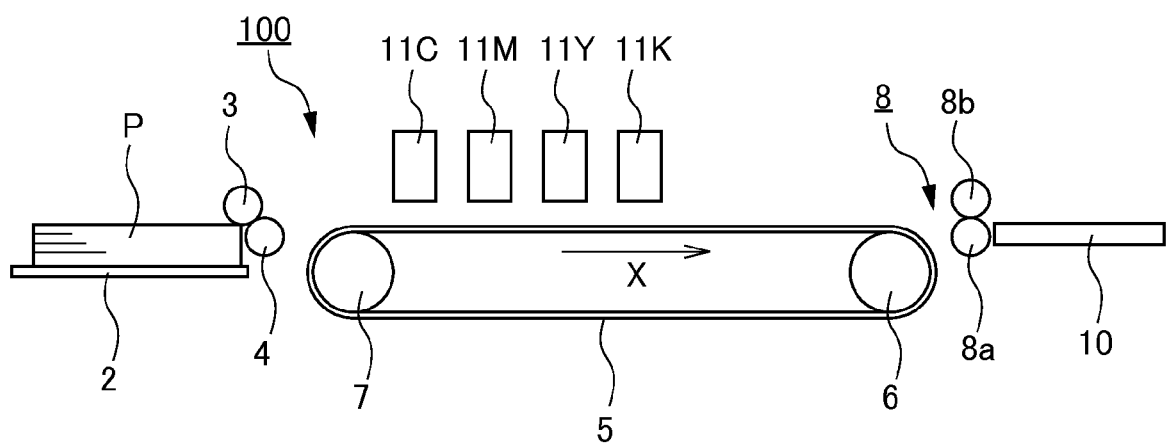
FIG. 1 is a cross-sectional view showing the configuration of an ink-jet recording apparatus of a line head-type of recording system.

Although embodiments of the present disclosure will be explained in detail hereinafter, the present disclosure is not to be limited to the following embodiments, and can be implemented by adding appropriate modifications within the scope of the object of the present disclosure. It should be noted that, although appropriate explanations may be omitted for passages for which explanation would be redundant, it is not to limit the gist of the disclosure.

First Embodiment

A first embodiment of the present disclosure relates to an ink for inkjet recording apparatuses, containing at least water, a pigment dispersion, a high penetrating agent, a penetrating agent, and a humectant. The pigment dispersion contains a resin having a molecular weight of 35,000 to 140,000, and a specific amount of pigment. The adsorbed resin proportion calculated from the total resin mass in the ink and free resin mass is at least 0.95 and less than 1.00. Glycerin and 1,3-propanediol as humectants and 1,2-octanediol as the high penetrating agent are contained in specific amounts, respectively. Furthermore, C2-C4 monoalkyl ethers of polyhydric alcohols are contained as the penetrating agent.

The ink for inkjet recording apparatuses according to the first embodiment (hereinafter also simply noted as ink) may contain a dissolution stabilizer that stabilizes the dissolved state of components contained in the ink, as necessary. Hereinafter, the water, pigment dispersion, humectant, high penetrating agent, penetrating agent and dissolution stabilizer, which are essential or optional components contained in the ink for inkjet recording apparatuses, as well as a method of producing the ink for inkjet recording apparatuses will be explained in sequence.

Water

The ink for inkjet recording apparatuses of the present disclosure is a water-based ink, and thus necessarily contains water. The water contained in the ink is not particularly limited so long as not inhibiting the object of the present disclosure, and a water of a desired purity can be appropriately selected and used from the waters used in the production of conventional water-based inks. The content of water in the ink for inkjet recording apparatuses of the present disclosure is not particularly limited so long as not inhibiting the object of the present disclosure. The content of water is appropriately adjusted depending on the amounts of other components used, as described later. As a typical content of water in the ink, at least 20% by mass and no more than 70% by mass relative to the total mass of ink is preferable, and at least 30% by mass and no more than 60% by mass is more preferable.

Pigment Dispersion

The ink for inkjet recording apparatuses of the present disclosure contains a pigment dispersion including a pigment as a coloring agent and a resin.

(Pigment)

Pigments that can be contained in the pigment dispersion are not particularly limited so long as not inhibiting the object of the present disclosure, and can be appropriately selected and used from pigments being used as coloring agents in conventional inks for inkjet recording apparatuses. Specific examples of preferable pigments can be exemplified as yellow pigment such as C.I. pigment yellows 74, 93, 95, 109, 110, 120, 128, 138, 139, 151, 154, 155, 173, 180, 185 and 193; orange pigments such as C.I. pigment oranges 34, 36, 43, 61, 63 and 71; red pigments such as C.I. pigment reds 122 and 202; blue pigments such as C.I. pigment blue 15; violet pigments such as C.I. pigment violet 19, 21 and 33; and black pigments such as C.I. pigment black 7.

The amount of pigment used in the ink for inkjet recording apparatuses of the present disclosure is at least 4% by mass and no more than 9.5% by mass relative to the total mass of the ink. If using ink in which the amount of pigment used is too small, it may be difficult to obtain an image having a desired image density. If using ink in which the amount of pigment used is excessive, the flowability of the ink may deteriorate and it may be difficult to obtain an image having a desired image density, while the penetrability to the recording medium of the ink may deteriorate be harmed, and offset may tend to occur.

The volume average particle diameter of the pigment contained in the pigment dispersion is preferably at least 30 nm and no more than 200 nm, and more preferably at least 70 nm and no more than 130 nm from the viewpoint of the properties of the ink such as color density, hue and stability. The volume average particle diameter of the pigment can be adjusted by adjusting the particle diameter of beads used when kneading the pigment and resin, and the processing time. In a case of using ink in which the volume average particle diameter of the pigment is too small, the image density of the formed image may fall below a desired value. In a case of using ink in which the volume average particle diameter of the pigment is excessive, clogging of the nozzles ejecting the ink may occur, and the ejection characteristics of the ink may deteriorate. The volume average particle diameter of the pigment can be measured using a sample in which the pigment dispersion has been diluted 300 times using ion-exchange water, and using a device such as a dynamic light scattering particle size distribution analyzer (made by Sysmex Corporation).

(Resin)

The resin contained in the pigment dispersion is not particularly limited so long as not inhibiting the object of the present disclosure, and can be appropriately selected and used from various resins used in the production of conventional pigment dispersions. As specific examples of preferable resins, styrene-acrylic acid-alkyl acrylate ester copolymers, styrene-methacrylic acid-alkyl methacrylate ester copolymers, styrene-acrylic acid copolymers, styrene-maleic acid copolymers, styrene-maleic acid-alkyl acrylate ester copolymers, styrene-methacrylic acid copolymers, styrene-alkyl methacrylate ester copolymers, styrene-maleic acid half ester copolymers, vinylnaphthalene-acrylic acid copolymers, and vinylnaphthalene-maleic acid copolymers can be exemplified. Since they are prepared easily and are excellent in effect of dispersing pigments, among these resins, styrene-acrylic resins including units derived from styrene and units derived from acrylic acid, methacrylic acid, an acrylic acid ester or a methacrylic acid ester such as styrene-acrylic acid-alkyl acrylate ester copolymers, styrene-methacrylic acid-alkyl methacrylate ester copolymers, styrene-acrylic acid copolymers, styrene-maleic acid-alkyl acrylate ester copolymers, styrene-methacrylic acid copolymers and styrene-alkyl methacrylate ester copolymers are preferable.

The pigment dispersion contained in the ink for inkjet recording apparatuses of the present disclosure contains a resin having a molecular weight of at least 35,000 and no more than 140,000. The molecular weight of the resin contained in the pigment dispersion is a weight average molecular weight (Mn), and can be measured using gel filtration chromatography. In a case of using ink in which the molecular weight of the resin is too low, it will be difficult to obtain an image having a desired image density upon forming the image on the recording medium. In addition, in a case of using ink in which the molecular weight is excessive, since the viscosity of the ink will be high, it will be difficult for ink droplets to spread out even if the ink is dropped onto the recording medium, and thus it will be difficult to obtain an image having a desired image density. In addition, in a case of using ink in which the molecular weight is excessive, since the viscosity of the ink will be high, it will be difficult for the ink to penetrate the recording medium, and thus it will be difficult to suppress the occurrence of offset. The above-mentioned suitable molecular weight of the resins can be adjusted according to a known method of adjusting polymerization conditions such as the amount of polymerization initiator used, polymerization temperature and polymerization time upon obtaining the resin employing a polymerization reaction. More specifically, it is preferable to adjust the amount of polymerization initiator to preferably at least 0.001 moles and no more than 5 moles per 1 mole of monomer mixture, and more preferably at least 0.01 moles to no more than 2 moles, to appropriately adjust the amount of solvent used, to adjust the polymerization temperature to at least 50° C. and no more than 80° C., and to adjust the polymerization time to from 10 hours to 24 hours.

More specifically, a stirrer, a nitrogen introduction tube, a condenser, and a dropping funnel are set in a 1000-ml four-necked flask, 100 g of isopropyl alcohol and 250 g of methylethyl ketone are added to the flask, heated and refluxed while bubbling nitrogen. A mixture in which 40 g of methyl methacrylate, 40 g of styrene, 10 g of butyl acrylate and 10 g of methacrylic acid, and 0.3 g of azobisisobutyronitrile (AIBN) as an initiator are mixed and dissolved is charged in the dropping funnel, and added drop-wise over about 2 hours into the reactant in the flask heated and refluxed at 70° C. After adding drop-wise, the reactant is further heated and refluxed over 6 hours, and 150 g of methylethyl ketone containing 0.1 g of AIBN is added drop-wise over 15 minutes. Thereafter, heating and refluxing was conducted for a further 5 hours, whereby a styrene-acrylic resin having a molecular weight of 20,000 and an acid value of 100 mg KOH/g can be obtained.

When adjusting the molecular weight, a styrene-acrylic resin with a molecular weight of 30,000 can be prepared using a method such as the method of decreasing the amount of initiator by 70 percent of the above specific example, or a method of changing the temperature of the heating and refluxing in the above specific example to 80° C. In addition, a styrene-acrylic resin with a molecular weight of 70,000 can be prepared using methods such as a method halving half of the amount of solvent of the above-mentioned specific example (50 g of isopropyl alcohol, 150 g of methylethyl ketone), or a method decreasing the amount of initiator of the above-mentioned specific example. However, in a case of decreasing the amount of initiator, the polymerization reaction of the reactants may stop and the residual monomer may increase. In addition, 2-mercapto ethanol may be added in a small amount (no more than 0.001 moles per 1 mole of monomer mixture) as a chain-transfer agent.

In addition, the acid value of the resin used in the preparation of the pigment dispersion is preferably at least 50 mg KOH/g and no more than 200 mg KOH/g. In a case of using ink in which the acid value of the resin is too low, since the dispersibility of the pigment in the pigment dispersion tends to decrease, and microparticulation of the pigment becomes difficult, the formed image may not have favorable colorability and chromic property. In a case of using ink in which the acid value of the resin is excessive, the storage stability of the ink may tend to decrease. The acid value of the resin can be adjusted by appropriately adjusting the amount of monomers used such as acrylic acid and methacrylic acid having an acidic functional group such as a carboxyl group, upon synthesizing the resin. More specifically, it is possible to raise the acid value by increasing the amount of monomers used having acidic functional groups.

The amount of resin used when producing the pigment dispersion is not particularly limited so long as not inhibiting the object of the present disclosure. Typically, it is used in an amount in the range of at least 30 parts by mass to no more than 70 parts by mass relative to 100 parts by mass of pigment.

(Production Method of Pigment Dispersion)

The method of producing the pigment dispersion containing pigment and resin is not particularly limited so long as not inhibiting the object of the present disclosure, and can be appropriately selected from conventional, known methods. As a favorable method, a method can be exemplified that uses a media-type wet disperser like a Nano Grain Mill (made by Asada Tekko), an MSC Mill (made by Mitsui Mining Co., Ltd.) and a Dyno Mill (made by Shinmaru Enterprises Corporation) to knead the pigment and resin in a medium of a suitable liquid such as water to make the pigment dispersion. Small-diameter beads are used in the processing using the media-type wet disperser. The particle diameter of the beads is not particularly limited, and typically is at least 0.5 mm and no more than 1.0 mm. In addition, the material properties of the beads are not particularly limited, and a hard material such as zirconia is used.

The amount of liquid medium used upon producing the pigment dispersion is not particularly limited so long as the pigment and resin can be favorably kneaded. Typically, the amount of liquid medium used is preferably a mass at least 1 time and no more than 10 times relative to the total of the mass of pigment and resin, and more preferably a mass at least 2 times and no more than 8 times.

Humectant

The humectant is a component that causes the viscosity of ink to stabilize by suppressing vaporization of the liquid component from the ink. The ink for inkjet recording apparatuses of the present disclosure includes glycerin and 1,3-propanediol as humectants. The content of glycerin in the ink is at least 5% by mass relative to the total mass of ink, and more preferably at least 5% by mass and no more than 10% by mass. In addition, the content of 1,3-propanediol in the ink is at least 10% by mass and no more than 30% by mass relative to the total mass of ink.

In a case of using ink in which the content of 1,3-propanediol serving as humectant is too small, contamination of the recording medium caused by offset will tend to arise, even if the content of glycerin is at least 5% by mass. On the other hand, in a case of using ink in which the content of 1,3-propanediol is excessive, after the recording head has been left for a long time without capping, it will be difficult to recover the ejection state of ink from the recording head to the state prior to being left, even if a recovery operation of carrying out purging and wiping on the recording head is performed.

In addition, the ink for inkjet recording apparatuses of the present disclosure may include other humectants than glycerin and 1,3-propanediol in amounts of a range that do not inhibit the object of the present disclosure. As specific examples of humectants other than glycerin and 1,3-propanediol that can be blended into the ink, polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodigylcol, 1,3-butanediol and 1,5-pentanediol can be exemplified. One type of these humectants may be used individually, or may be used by combining two or more types.

The total amount of the content of humectants is preferably at least 15% by mass and no more than 50% by mass relative to the total mass of ink, and more preferably at least 15% by mass and no more than 40% by mass.

High Penetrating Agent

The ink for inkjet recording apparatuses of the present disclosure contains a high penetrating agent. The high penetrating agent is 1,2-octanediol, which is an alkanediol with 8 carbon atoms. Due to having a low surface tension, the high penetrating agent can lower the surface tension of the ink. For this reason, in a case of using ink containing a high penetrating agent, the ink quickly and moderately penetrates the recording medium, whereby it is possible to form an image having a desired image density, while suppressing contamination of the recording medium caused by offset. In addition, the high penetrating agent has high boiling point. For this reason, for an ink containing a high penetrating agent, volatilization is suppressed, and the attributes thereof do not easily change, even in a case of the ink not being ejected from the head for a long time.

In a case of having used an alkanediol with 7 or less carbon atoms such as 1,2-heptanediol, the penetrability of the ink into the recording medium will not adequately rise compared to 1,2-octanediol, and contamination of the recording medium caused by offset will tend to occur. In addition, in a case of having used an alkanediol with 9 or more carbon atoms such as 2-butyl-2-ethyl-1,3-propanediol, the solubility in water will lower compared to 1,2-octanediol; therefore, the high penetrating agent in the ink tends to solidify in the recording head when the recording head filled with ink has been left for a long time without capping. In such a case, even if performing a recovery operation of carrying out purging and wiping on the recording head, it will be difficult to dissolve and remove the solidified high penetrating agent, and it will be difficult to recover the ejection state of the ink from the recording head to the state prior to being left.

In a case of using as the high penetrating agent an alkanediol that has 8 carbon atoms and substituted positions of hydroxyl groups differing from 1,2-octanediol, such as an alkyl-substituted 1,3-hexanediol like 2-ethylhexanediol, it is possible to adequately raise the penetrability of the ink into the recording medium, by blending the high penetrating agent of an amount giving a concentration of at least 2.0% by mass into the ink. However, in such a case, it will be difficult to form an image having a desired image density.

Among alkanediols having 8 carbon atoms, 1,2-octanediol has a high melting point and low solubility in water. For this reason, in a case of leaving the recording head in which ink containing 1,2-octanediol is filled for a long time without capping, the high penetrating agent in the ink tends to solidify in the recording head. However, by using 1,2-octanediol along with 1,3-propanediol used as the aforementioned humectant, the ink will quickly and moderately penetrate into the recording medium upon image formation, whereby it is possible to form an image having a desired image density while suppressing contamination of the recording medium caused by offset, and an ink can be obtained for which the attributes thereof do not easily change even in a case of the ink not being ejected from the head for a long time.

The content of high penetrating agent in the ink is at least 0.2% by mass and no more than 0.8% by mass. In a case of using ink in which the content of high penetrating agent is too small, since the penetrability of the ink into the recording medium cannot be adequately raised, contamination of the recording medium caused by offset tends to occur. In a case of using ink in which the content of the high penetrating agent is excessive, since the penetrability of the ink into the recording medium will become too high, the pigment will tend to penetrate inside of the recording medium along with the liquid component of the ink. For this reason, if using ink abundantly containing high penetrating agent, it may be difficult to form an image having a desired image density. In addition, if using ink in which the content of high penetrating agent is excessive, the high penetrating agent in the ink tends to solidify in the recording head in a case of leaving the recording head filled with ink for a long time without capping. In such a case, even if performing a recovery operation of carrying out purging and wiping on the recording head, it will be difficult to dissolve and remove the solidified high penetrating agent, and thus difficult to recover the ejection state of ink from the recording head to the state prior to being left.

Penetrating Agent

The ink for inkjet recording apparatuses of the present disclosure contains a penetrating agent in addition to the high penetrating agent. The penetrating agent is a C2-C4 monoalkyl ether of a polyhydric alcohol.

In a case of raising the penetrability of the ink into the recording medium with only the high penetrating agent, the content of the high penetrating agent in the ink will become great. In such a case, the aforementioned flaw tends to occur. For this reason, the high penetrating agent and penetrating agent are combined and used with the purpose of supplementing the effect of the penetrability improvement of the high penetrating agent used in an amount in an appropriate range.

As specific examples of C2-C4 monoalkyl ethers of polyhydric alcohols, triethylene glycol monobutyl ether, diethylene glycol monopropyl ether and triethylene glycol monoethyl ether can be exemplified.

The amount of penetrating agent used in the ink is not particularly limited so long as not inhibiting the object of the present disclosure. The content of penetrating agent in the ink is preferably at least 2% by mass and no more than 5% by mass, in a case of the C2-C4 monoalkyl ether of a polyhydric alcohol being triethylene glycol monobutyl ether. In addition, it is preferably at least 2% by mass to no more than 6% by mass in a case of the C2-C4 alkyl ether of a polyhydric alcohol being diethylene glycol monopropyl ether and/or triethylene glycol monoethyl ether. In a case of using ink in which the content of penetrating agent is too low, it will be difficult for the recording medium to be wetted by the ink, and thus difficult for the ink to penetrate the recording medium; therefore, contamination of the recording medium caused by offset will tend to occur, and in some cases, it will also be difficult to form an image having a desired image density. In a case of using ink in which the content of penetrating agent is excessive, the penetrability of the ink into the recording medium will become too high, and the pigment will tend to penetrate inside of the recording medium along with the liquid component of the ink. For this reason, if using an ink abundantly containing penetrating agent, it will be difficult to form an image having a desired image density.

In addition, the ink for inkjet recording apparatuses of the present disclosure may contain organic solvents other than the aforementioned penetrating agent in an amount of a range that does not inhibit the object of the present disclosure, with the purpose of adjusting the penetrability of the ink into the recording medium.

Dissolution Stabilizer

The dissolution stabilizer is a component that causes the dissolution state of the ink to stabilize by compatibilizing the components contained in the ink. As specific examples of the dissolution stabilizer, 2-pyrrolidone, N-methyl-2-pyrrolidone and γ-butyrolactone can be exemplified. These dissolution stabilizers can be used by combining two or more types. In a case of the ink containing a dissolution stabilizer, the content of the dissolution stability is preferably at least 1% by mass and no more than 20% by mass relative to the total mass of ink, and more preferably at least 3% by mass and no more than 15% by mass.

Method for Producing Ink for Inkjet Recording Apparatuses

The method for producing the ink for inkjet recording apparatuses of the present disclosure is not particularly limited so long as after the dissolution stabilizer is added as necessary to the water, pigment dispersion, humectant, high penetrating agent and penetrating agent, these ink components can be uniformly mixed. As a specific example of the method for producing the ink for inkjet recording apparatuses, a method of uniformly mixing each component of the ink using a mixer, and then removing foreign contamination and coarse particles using a filter with a pore size of no more than 10 μm can be exemplified. It should be noted that, when producing the ink for inkjet recording apparatuses, various additives that are added to conventional inks for inkjet recording apparatuses can be added to the water, pigment dispersion, humectant, high penetrating agent and penetrating agent, such as liquid components other than organic solvents such as the dissolution stabilizer and humectant, as well as surfactant, anti-oxidant, viscosity modifier, pH adjuster and antisepsis/antifungal agent, as necessary.

In addition, the ink for inkjet recording apparatuses of the present disclosure has an adsorbed resin proportion derived from the pigment dispersion that is at least 0.95 and less than 1.00, and obtained from the overall mass of resin in the ink and the mass of resin separating from the pigment in the ink. By setting the adsorbed resin proportion to such a range, even in a case of an ink droplet having dried on the recording medium, it becomes difficult to prevent penetration to the recording medium of the ink droplet newly landed at the location at which the ink droplet dried, a result of which the occurrence of offset is suppressed. In a case of using ink having an adsorbed resin proportion less than 0.95, it becomes difficult to suppress the occurrence of offset due to it becoming difficult for the ink droplet to penetrate the recording medium from the free resin in the ink increasing.

The adsorbed resin proportion can be calculated using the following formula from the mass of free resin (unadsorbed resin) contained in the ink and the total mass of resin contained in the ink. It should be noted that the adsorbed resin proportion in the pigment dispersion can be similarly calculated from the following formula from the amount of free resin contained in the pigment dispersion and the total mass of resin.

$$\text{Adsorbed resin proportion} = 1 - (\text{free resin mass/total resin mass})$$

Herein, the mass of free resin in the ink can be measured using the following method.

Method of Measuring Mass of Free Resin

The ink is placed in a predetermined container, and the ink is centrifuged for 24 hours under the condition for revolution speed of 5000 rpm, using a centrifuge (NS-C100 (made by Nano Seeds Corporation)). The solid content with free resin as the main component is obtained by collecting the entire amount of transparent supernatant fluid of ink in the container, and drying the supernatant fluid at 150° C. under the reduced pressure condition of 0.67 Pa. The mass of free resin in the ink is calculated using the following formula, with the mass of ink placed in the centrifuge as Wi (g), and the mass arrived at by deducting the mass of components not volatilizing under drying conditions, among the components like surfactant, anti-oxidant, viscosity modifier, pH adjuster and antisepsis/antifungal agent contained in the ink placed in the centrifuge, from the mass of solid content obtained by drying the supernatant fluid, as Wr(g).

$$\text{Mass of free resin}(\% \text{ by mass}) = (Wr/Wi) \times 100$$

Methods of adjusting the mass of free resin in the ink that can be exemplified are a method of adjusting the resin amount upon preparing the pigment dispersion, a method of adjusting the specific surface area of pigment contained in the pigment dispersion by changing the dispersion conditions upon preparing the pigment dispersion, to adjust the resin amount adsorbed to pigment, and a method of preparing ink by precipitating pigment by centrifuging the ink, substituting at least a part of the supernatant fluid with liquid components contained in ink not containing resin, and then causing the precipitated pigment to disperse again.

In addition, it is possible to adjust the mass of free resin contained in the pigment dispersion by centrifuging the pigment dispersion using the above-mentioned method, and replacing the supernatant liquid containing separated free resin with an equivalent amount of water.

If using the ink for inkjet recording apparatuses according to the first embodiment explained in the foregoing, it is possible to easily recover the ejection state of ink droplets from the recording head to a satisfactory state, even in a case of the recording head filled with ink during image formation having been left for a long time without capping. In addition, it is possible to balance the suppression of the occurrence of offset during image formation and the forming of images having a desired image density. For this reason, the ink for inkjet recording apparatuses according to the first embodiment is suitably used in various inkjet recording apparatuses.

Second Embodiment

The second embodiment relates to a method for forming images that forms an image using an inkjet recording apparatus, using the ink for inkjet recording apparatuses according to the first embodiment. The recording system of the inkjet recording apparatus using the method for forming images according to the second embodiment is not particularly limited, and may be serial type that performs recording while the recording head scans over a recording medium, or may be a line head-type that performs recording using a recording head fixed to an apparatus main body. As the inkjet recording apparatus used in the method for forming images according to the second embodiment, a recording apparatus equipped with a recording head of line head-type is preferable from the aspect of the high speed of image formation, and a recording apparatus equipped with a long line head installed in a perpendicular direction relative to the direction of conveying recording media is more preferable.

In a case of using an inkjet recording apparatus of a line head-type recording system, since overlapped drawing of the image is not performed, it is necessary to raise the amount of ink ejected in order to form an image having a desired image density. In this case, contamination of the recording medium caused by offset in particular tends to arise. However, according to the method for forming images of the second embodiment, it is possible to balance the suppression of contamination of the recording medium caused by offset and the forming of an image having a desired image density, due to using the ink for inkjet recording apparatuses according to the first embodiment. In addition, according to the method for forming images of the second embodiment, due to using the ink for inkjet recording apparatuses according to the first embodiment, it is possible to suppress disturbances in the image upon forming images after ink not having been ejected from the recording head for a long time. In addition, even in a case of the recording head filled with ink having been left for a long time without capping, it is possible to easily recover the ejection state of ink droplets from the recording head to a satisfactory state.

Figure 2:
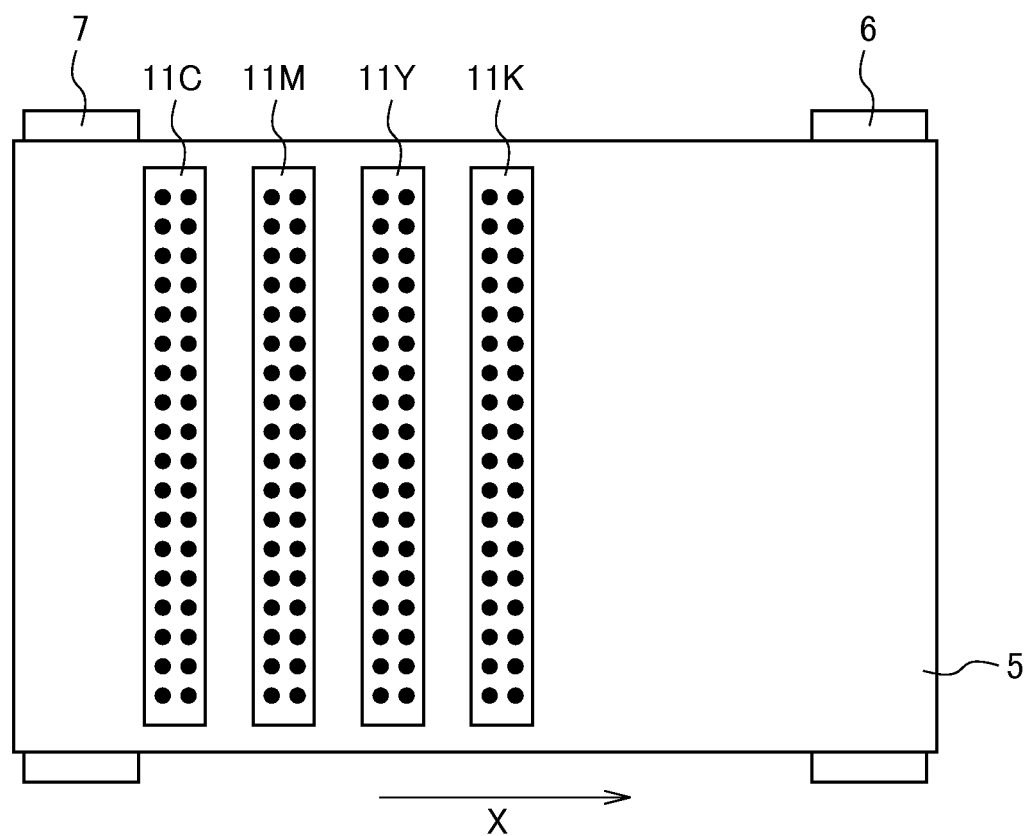
FIG. 2 is a plan view in which a conveyor belt of the inkjet recording apparatus shown in FIG. 1 is seen from above.

Hereinafter, the method for forming images of the second embodiment will be explained for a case of using an inkjet recording apparatus of a line head-type recording system, and using recording paper as the recording medium. FIG. 1 is a cross-sectional view showing the configuration of an inkjet recording apparatus of a line head-type recording system, and FIG. 2 is a plan view in which a conveyor belt of the inkjet recording apparatus shown in FIG. 1 is seen from above.

As shown in FIG. 1, a paper feed tray 2 (paper feed part) accommodating recording paper P is provided on a left side part of an inkjet recording apparatus 100. A paper feed roller 3 for feeding and conveying the recording paper P accommodated sequentially sheet by sheet from an uppermost recording paper P to a conveyor belt 5, and a driven roller 4 that pressure-contacts with the paper feed roller 3 and is rotationally driven thereby are provided at one end of the paper feed tray 2.

The conveyor belt 5 is arranged to be rotatable on a downstream side in a paper conveying direction X (right side in FIG. 1) relative to the paper feed roller 3 and driven roller 4. The conveyor belt 5 is stretched over a belt drive roller 6 arranged on the downstream side in the paper conveying direction X, and a belt roller 7 that is arranged on an upstream side and is rotationally driven by the belt drive roller 6 via the conveyor belt 5. The recording paper P is conveyed in the arrow X direction, by the belt drive roller 6 being rotationally driven in the clock-wise direction.

Herein, since a portion of the conveyor belt 5 (upwards in FIG. 1) at the paper feed direction is drawn by the belt drive roller 6 by arranging the belt drive roller 6 on a downstream side in the paper conveying direction X, it is possible to stretch the belt without slack occurring; therefore, the stable conveyance of the recording paper P becomes possible. It should be noted that a sheet made of dielectric resin is used for the conveyor belt 5, and in regards to the form thereof, one without seams (seamless) is used.

In addition, on the downstream side in the paper conveying direction X of the conveyor belt 5, an ejection roller pair 8 (ejection part) is provided, consisting of an ejection roller 8a that is driven rotationally clockwise in the figure and ejects the recording paper P on which an image has been recorded out of the apparatus main body, and a driven roller 8b that is in pressure-contact with the top of the ejection roller 8a to be rotationally driven. A paper ejection tray 10 on which the recording paper P ejected out of the apparatus main body are stacked is provided on the downstream side in the paper conveying direction X of the ejection roller pair 8.

Since the driven roller 8b directly contacts the image formation face of the recording paper P, it is preferable for the material forming the surface of the driven roller 8b to be a water repelling material. By forming the surface of the driven roller 8b using a water repelling material, it is possible to suppress the adherence to the roller of ink not penetrating the recording paper P, whereby the occurrence of offset tends to be suppressed. Fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride can be exemplified as suitable water repelling materials. Similarly to the driven roller 8b, the surface of the components directly contacting the image formation face of the recording paper P are preferably formed using a water repelling material.

Then, line heads 11C, 11M, 11Y and 11K, which are supported at heights such that a predetermined interval is formed relative to the top surface of the conveyor belt 5 and that perform recording of images on the recording paper P conveyed on the conveyor belt 5, are installed above the conveyor belt 5. Colored inks of four different colors (cyan, magenta, yellow and black) are filled in these line heads 11C to 11K, respectively. By ejecting the respective colored inks from each of the line heads 11C to 11K, a color image is formed on the recording paper P.

In order to reduce the size of the apparatus, the time from the droplets of ink ejected from each of the line heads 11C to 11K landing on the recording paper P until the landing location of ink on the recording paper P reaches the ejection part 8 is preferably within 1 second. The effect of suppressing the occurrence of offset during image formation at high speed is sufficiently obtained by using the ink according to the first embodiment, even in a case of this time being set to within 1 second.

In addition, the amount of ink of one color or a plurality of colors ejected from each of the line heads 11C to 11K to the recording paper P and landed on the recording paper P is not particularly limited. An image is formed by ejecting from each of the line heads 11C to 11K ink droplets adjusted to amount that can form an image having a desired image density and for which offset does not easily occur.

As shown in FIG. 2, these line heads 11C to 11K include nozzle arrays in which a plurality of nozzles are arranged in a direction orthogonal to the conveying direction (vertical direction in FIG. 2), and have a recording area of at least the width of the recording paper P conveyed, which makes it possible to form an image of one line at once on the recording paper conveyed on the conveying belt 5.

It should be noted that, with the inkjet recording apparatus of a line head-type recording system, although a line head configured so as to have a recording area of at least the width of the recording paper P is used by having a plurality of nozzles arranged in the longitudinally direction of the long head main body, which is formed to be at least the width dimension of the conveyor belt 5, it would not be a concern even if using a line head made so as to be able to record an image over the entire width in the width direction of the recording paper P conveyed, by arranging a plurality of short head units each equipped with a plurality of nozzles in the width direction of the conveyor belt 5.

As the ejection system of ink from the line heads 11C to 11K, it is possible to adopt various systems such as a piezoelectric element system that ejects droplets of ink using the pressure generating inside of liquid chambers of the line heads 11C to 11K employing piezoelectric elements that are not illustrated, or a thermal inkjet system that ejects ink by applying pressure by causing air bubbles to generate in the ink using a heating element. The ejection system of ink is preferably a piezoelectric element system due to the control of the ejection amount being simple.

Figure 3:
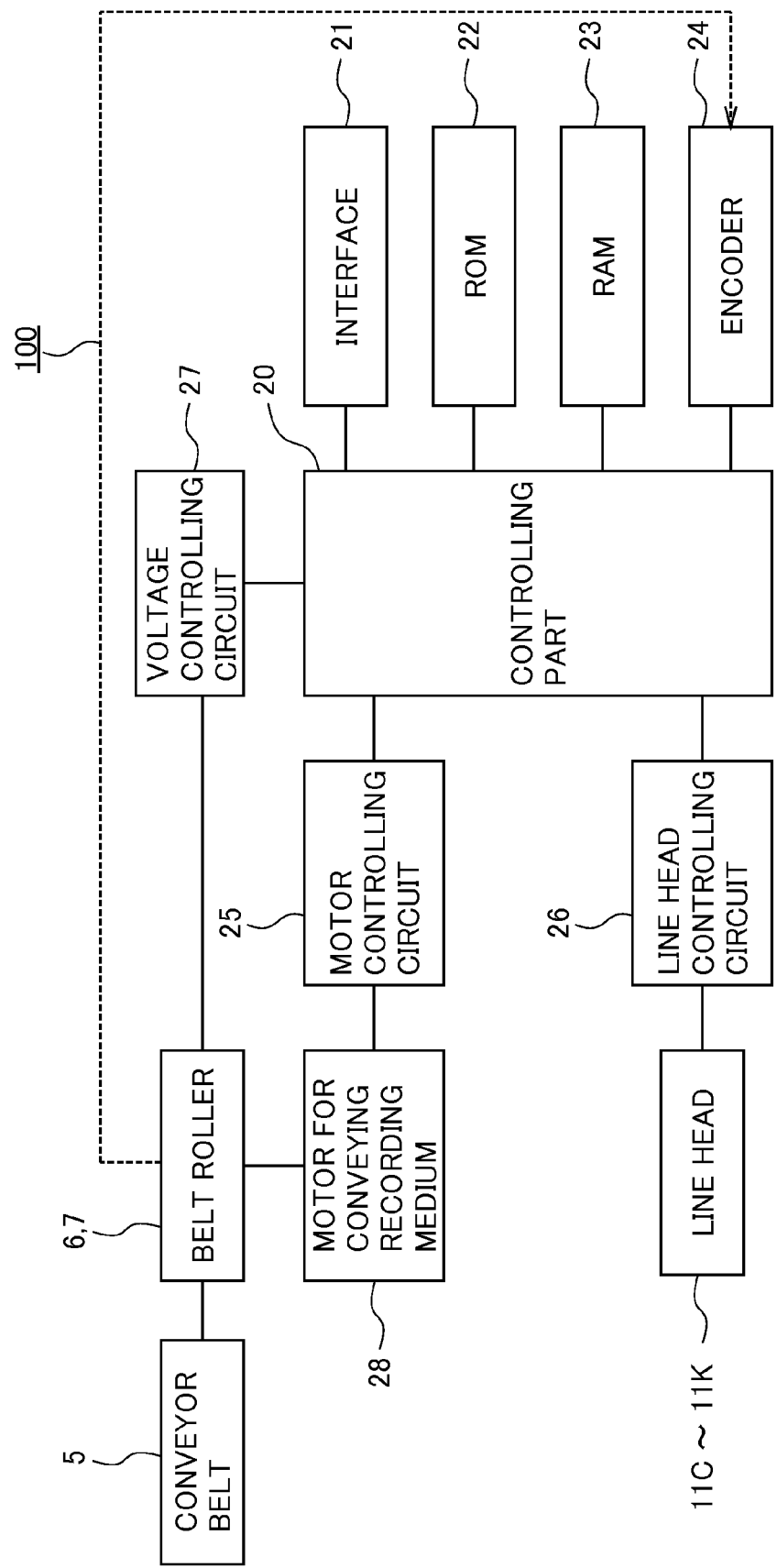
FIG. 3 is a block diagram showing the configuration of the inkjet recording apparatus of a line head-type of recording system.

FIG. 3 is a block diagram showing the configuration of an inkjet recording apparatus of a line head-type recording system. The same reference symbols are assigned to portions shared between FIGS. 1 and 2, and explanations thereof will be omitted. A controller 20 is equipped to the inkjet recording apparatus 100. An interface 21, ROM 22, RAM 23, encoder 24, motor control circuit 25, line-head control circuit 26 and voltage control circuit 27 are connected to the controller 20.

The interface 21 sends and receives data with a host device such as a personal computer that is not illustrated. The controller 20 converts an image signal received via the interface 21 into image data by conducting magnification-changing processing or gradation processing as necessary. Additionally, the controller 20 outputs control signals to various control circuits described later.

The ROM 22 stores control programs for when performing image recording by driving the line heads 11C to 11K. The RAM 23 stores image data that has been magnification-changing processed or gradation processed using the controller 20 in a predetermined region.

The encoder 24 is connected to the belt drive roller 6 on a paper ejection side driving the conveyor belt 5, and outputs a pulse train depending on the rotational displacement amount of the rotation axis of the belt drive roller 6. The controller 20 calculates the amount of rotation by counting the number of pulses sent from the encoder 24 to understand the feed amount of paper (paper position). Then, the controller 20 outputs control signals to the motor control circuit 25 and line-head control circuit 26 based on the signal from the encoder 24.

The motor control circuit 25 drives a motor 28 for conveying recording medium in accordance with the output signal from the controller 20. By the motor 28 for conveying recording medium driving to cause the belt drive roller 6 to rotate, the conveyor belt 5 is made to rotate in the clockwise direction in FIG. 1 to convey paper in the arrow X direction.

The line-head control circuit 26 transfers image data stored in the RAM 23 to the line heads 11C to 11k based on the output signal from the controller 20, and controls the ejection of ink from the line heads 11C to 11K based on the transferred image data. Formation of an image on the paper is performed according to such control and control of the conveyance of the paper using the conveyor belt 5 that is driven by the motor 28 for conveying recording medium.

The voltage control circuit 27 causes an alternating electric field to generate by applying voltage to the belt roller 7 on the paper feed side based on the output signal from the controller 20, thereby causing the paper to be statically attracted to the conveyor belt 5. The release of the static attraction is done by grounding the belt roller 7 or belt drive roller 6 based on the output signal from the controller 20. It should be noted that, although configured herein to apply voltage to the belt roller 7 on the paper feed side, it may be configured to apply voltage to the belt drive roller 6 on the paper ejection side.

Figure 4:
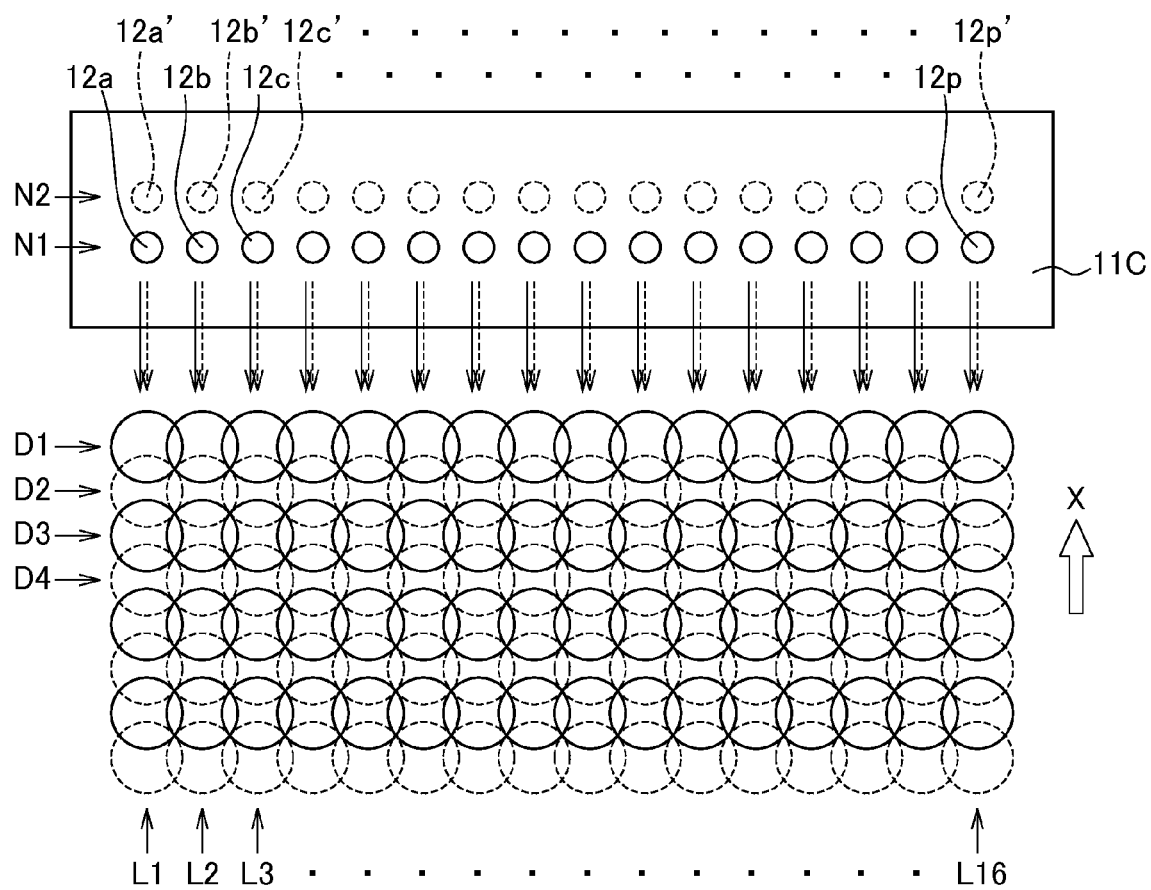
FIG. 4 is a plan view showing a line head used in the inkjet recording apparatus of s line head-type recording system and a part of a dot row formed on a recording sheet.

The method of forming dots using the inkjet recording apparatus of a line head-type recording system will be specifically explained using FIG. 4. It should be noted that, among the line heads 11C to 11K illustrated in FIGS. 1 and 2, the line head 11C will be explained as an example with FIG. 4; however, the same explanation similarly applies for all of the other line heads 11M to 11K.

As shown in FIG. 4, the nozzle arrays N1 and N2 consisting of a plurality of nozzles are arranged in parallel to the conveying direction of the recording paper P (arrow X direction) in the line head 11C. In other words, as the nozzles forming each dot array in the conveying direction of the recording paper P, a total of two nozzles are provided for each one in the nozzle arrays N1 and N2 (nozzles 12a and 12a' in dot array L1). It should be noted that, for convenience of explanation, although only the respective 16 nozzles of 12a to 12p and 12a' to 12p' corresponding to the dot arrays L1 to L16 will be described among the nozzles configuring the nozzle arrays N1 and N2, it is configured so that several more nozzles are actually arranged in a direction orthogonal to the conveying direction of the recording paper P.

Then, an image is formed on the recording paper P serving as a recording medium, sequentially using these nozzle arrays N1 and N2. After forming the dot array D1 of one line in the width direction (left-right direction in figure) of the recording paper P by ejecting ink from the nozzle array N1 (solid arrow in figure), while moving the recording paper P in the conveying direction of the recording paper P, a subsequent dot array D2 of one line is formed by ejecting ink from the nozzle array N2 (dotted arrow in the figure), and then a subsequent dot array D3 of one line is further formed by ejecting ink from the nozzle array N1 again. Hereinafter, dot arrays D4 and after are also formed similarly by alternately using the nozzle arrays N1 and N2.

According to the method for forming images according to the second embodiment explained above, even in a case of leaving the recording head filled with ink for a long time without capping, it is possible to easily recover the ejection state of ink droplets from the recording head to a satisfactory state, and the suppression of the occurrence of offset and the formation of images having a desired image density can be balanced. For this reason, the method for forming images according to the second embodiment can be suitably employed in various inkjet recording apparatuses.

EXAMPLES

Hereinafter, the present disclosure will be explained more specifically using Examples. It should be noted that the present disclosure is not to be limited by the Examples.

Preparation Example 1

The styrene-acrylic resin to be used in the preparation of the pigment dispersion was produced using a macromonomer synthesis method. Specifically, a stirrer, nitrogen introduction tube, condenser, and dropping funnel were set in a 1000-ml four-necked flask, 100 g of isopropyl alcohol and 250 g of methylethyl ketone were added to the flask, and then heated and refluxed while bubbling nitrogen gas. A solution in which 40 g of methyl methacrylate, 40 g of styrene, 10 g of butyl acrylate and 10 g of methacrylic acid, as well as 0.3 g of azobisisobutyronitrile (AIBN) as an initiator had been mixed and dissolved was placed in the dropping funnel. Then, in a state heating and refluxing the contents of the flask at 70° C., the solution in the dropping funnel was added dropwise into the flask over about 2 hours. After the dropwise addition, the contents of the flask were further heated and refluxed for 6 hours, and then 150 g of methylethyl ketone including 0.1 g of AIBN were added dropwise into the flask over 15 minutes. Subsequently, the contents of the flask were heated and refluxed for 5 hours, thereby obtaining styrene-acrylic resin with a molecular weight of 20,000 and acid value of 100 mg KOH/g. Next, different molecular weight resins A to G were produced by appropriately adjusting the solvent amount used and changing the amount of polymerization initiator used to at least 0.001 moles and no more than 5 moles per 1 mole of monomer mixture, changing the polymerization temperature to at least 50° C. and no higher than 80° C., and changing the polymerization time to at least 10 hours and no more than 24 hours.

The weight average molecular weight (Mw) of the obtained resin was measured according to the following conditions using gel filtration chromatography (HLC-8020GPC (made by Tosoh Corp.)). The weight average molecular weights of resins A to G are shown in Table 1. In addition, the acid values (mg KOH/g) of the obtained resins were confirmed by titration. The acid values of the obtained resins A to G are shown in Table 1.

Weight Average Molecular Weight Measurement Conditions
Column: TSKgel, Super Multipore HZ-H (4.6 mm ID×15 cm, made by Tosoh Corp.)
Number of columns: 3
Eluent: tetrahydrofuran
Flow rate: 0.35 ml/min
Sample injection amount: 10 μl
Measurement temperature: 40° C.
Detector: IR detector A calibration curve was prepared by selecting from reference standards (TSK standard, polystyrene, made by Tosoh Corp.), the 8 types of F-40, F-20, F-4, F-1, A-5000, A-2500, A-1000 and n-propylbenzene.

TABLE 1

| Resin | Weight average molecular weight (Mw) | Acid value (mg KOH/g) |
|---|---|---|
| A | 20,000 | 100 |
| B | 33,000 | 90 |
| C | 36,000 | 100 |
| D | 53,000 | 110 |
| E | 98,000 | 100 |
| F | 139,000 | 140 |
| G | 143,000 | 155 |

Reference Example 1

The ingredients of the pigment dispersion were loaded in a Dyno Mill (made by Shinmaru Enterprises Corp.) so as to make up 78.5% by mass ion-exchange water, 6.0% by mass resin A, 15% by mass cyan pigment (P.B-15:3), and 0.5% by mass surfactant (OLFINE E1010, ethylene oxide adduct of acetylenediol, made by Nissin Chemical Industry Co., Ltd.). Next, zirconia beads of the particle diameter listed in Table 2 were filled into the vessel of the Dyno Mill. Thereafter, the pigment dispersion was prepared by treating according to the conditions 1 to 4 listed in Table 2. It should be noted that resin A was neutralized by NaOH aqueous solution of 105% neutralization equivalent. In addition, the mass of Na was calculated as the mass of resin, and the mass of water contained in the NaOH aqueous solution and the water produced in the neutralization reaction was calculated as the mass of ion exchange water.

Using the pigment dispersion obtained according to the conditions 1 to 4, 40% by mass pigment dispersion, 4.5% by mass triethylene glycol monobutyl ether, 5% by mass 2-pyrrolidone, 0.5% by mass surfactant (OLFINE E1010, ethylene oxide adduct of acetylenediol, made by Nissin Chemical Industry Co., Ltd.), 0.6% by mass 1,2-octanediol, 10% by mass glycerin and 1,3-propanediol was uniformly mixed with ion exchange water using an agitator. Thereafter, four types of ink were obtained by filtering the uniformly mixed liquid using a filter with a pore size of 5 μm. It should be noted that the amounts of glycerin and ion exchange water used were appropriately adjusted so that the viscosities of the four types of inks became the same. For the obtained inks, the adsorbed resin proportions were measured according to the following method.

Adsorbed Resin Proportion Measurement Method

Ten grams of ink were charged into a predetermined container, and the ink was centrifuged for 24 hours under the condition for revolution speed of 5000 rpm, using a centrifuge (NS-C100 (made by Nano Seeds Corporation)). After centrifuging, the solid content with free resin as the main component was obtained by collecting the entire amount of transparent supernatant fluid of ink in the container, and drying the supernatant fluid at 150° C. under the reduced pressure of 0.67 Pa. It should be noted that the surfactant contained in the ink volatilizes under the drying conditions. With the mass of obtained solid content as the mass of free resin, the content of free resin in the pigment dispersion was calculated. Next, the adsorbed resin proportion was obtained from the value of the content of obtained free resin using the following formula.

Adsorbed resin proportion=1−(mass of free resin/total mass of resin in ink)

TABLE 2

| Dispersion condition | Condition 1 | Condition 2 | Condition 3 | Condition 4 |
|---|---|---|---|---|
| First pass | | | | |
| Zirconia bead diameter | 1.0 mm | 0.5 mm | 1.0 mm | 1.0 mm |
| Ejection amount (g/min) | 300 | 300 | 300 | 300 |
| Second pass | | | | |
| Zirconia bead diameter | — | — | 1.0 mm | 0.5 mm |
| Ejection amount (g/min) | — | — | 200 | 300 |
| Resin/Pigment mass ratio | 0.4 | 0.4 | 0.4 | 0.4 |
| Resin amount in ink (% by mass) | 2.4 | 2.4 | 2.4 | 2.4 |
| Free resin amount in ink (% by mass) | 0.18 | 0.09 | 0.054 | 0.02 |
| Adsorbed resin proportion | 0.925 | 0.963 | 0.978 | 0.992 |

It is found from Table 2 that, by changing the production conditions of the pigment dispersion such as the diameter of the zirconia beads, number of treatment times using the Dyno Mill and ejection amount, it is possible to adjust the amount of free resin contained in the ink, whereby the adsorbed resin proportion can be adjusted.

Preparation Example 2

Preparation of Pigment Dispersion

P.B-15:3 was used as the cyan pigment. Relative to the total of the mass of ingredients used in the preparation of the pigment dispersion, 15% by mass of pigment, styrene-acrylic resin of the type and amount listed in Tables 3 and 4, and 0.5% by mass of surfactant (OLFINE E1010, ethylene oxide adduct of acetylenediol, made by Nissin Chemical Industry Co., Ltd.), and the remainder water were loaded into the Dyno Mill (Multipurpose laboratory, vessel volume 0.6 L, made by Shinmaru Enterprises Corp.). Next, potassium hydroxide of an amount necessary to neutralize the styrene-acrylic resin was added to the Dyno Mill. Thereafter, zirconia beads with a bead diameter of 0.5 mm were filled into the Dyno Mill as media so as to be 70% relative to the vessel volume, and the pigment and styrene-acrylic resin were kneaded under the conditions of 10° C. and circumferential velocity of 8 m/s, while water cooling. The number of treatment times in the Dyno Mill and ejection amount were appropriately changed to obtain pigment dispersions 1 to 14 with the adsorbed resin proportions listed in Tables 3 and 4. The obtained pigment dispersion was diluted 300 times using ion exchange water, and the volume average particle diameter D50 of the pigment was measured by a dynamic light scattering particle size distribution measurement apparatus (Zetasizer Nano, manufactured by Sysmex Corporation), whereby the volume average particle diameter D50 of the pigment was confirmed to be in the range of at least 70 nm to no more than 130 nm.

In addition, the adsorbed resin proportions of pigment dispersions 1 to 14 were obtained according to the following method. The adsorbed resin proportions of pigment dispersions 1 to 14 are listed in Tables 3 and 4. It should be noted that pigment dispersion 8 was adjusted to a content of free resin in the pigment dispersion of 0% by mass by centrifuging pigment dispersion 8 and replacing the entire amount of supernatant fluid containing separated free resin with water of an amount equal to the supernatant fluid, using the following method.

Adsorbed Resin Proportion Measurement Method

Ten grams of the pigment dispersion were charged into a predetermined container, and centrifuged for 24 hours under the condition for revolution speed of 5000 rpm, using a centrifuge (NS-C100 (made by Nano Seeds Corporation)). After centrifuging, the solid content with free resin as the main component was obtained by collecting the entire amount of transparent supernatant fluid of pigment dispersion in the container, and drying the supernatant fluid at 150° C. under the reduced pressure of 0.67 Pa. It should be noted that the surfactant contained in the pigment dispersion volatilizes under the drying conditions. With the mass of obtained solid content as the mass of free resin, the content of free resin in the pigment dispersion was calculated. Next, the adsorbed resin proportion was obtained from the value of the content of obtained free resin using the following formula.

Adsorbed resin proportion=1−(mass of free resin/total mass of resin)

It should be noted that the components other than the pigment dispersion contained in the ink prepared in the following Examples and Comparative Examples all volatilize under the above-mentioned drying conditions. For this reason, the adsorbed resin proportion of the inks prepared in the following Examples and Comparative Examples become equal to the adsorbed resin proportions of the pigment dispersions used in the preparation of inks.

TABLE 3

| Pigment dispersion | | 1 | 2 | 3 | 4 | 5 | 6 | 7 |
|---|---|---|---|---|---|---|---|---|
| Resin | Type | A | B | C | D | E | F | G |
| | Amount used (% by mass) | 6.0 | 6.0 | 7.0 | 6.0 | 5.5 | 5.0 | 5.0 |
| | Pigment (% by mass) | 15 | 15 | 15 | 15 | 15 | 15 | 15 |
| | OLFINE 1010 (% by mass) | 0.5 | 0.5 | 0.5 | 0.5 | 0.5 | 0.5 | 0.5 |
| | Free resin amount (% by mass) | 0.18 | 0.15 | 0.17 | 0.15 | 0.16 | 0.15 | 0.18 |
| | Adsorbed resin proportion | 0.970 | 0.975 | 0.976 | 0.975 | 0.971 | 0.970 | 0.964 |

TABLE 4

| Pigment dispersion | | 8 | 9 | 10 | 11 | 12 | 13 | 14 |
|---|---|---|---|---|---|---|---|---|
| Resin | Type | D | D | D | D | D | D | D |
| | Amount used (% by mass) | 4.0 | 6.0 | 5.0 | 6.0 | 5.5 | 5.5 | 5.5 |
| | Pigment (% by mass) | 15 | 15 | 15 | 15 | 15 | 15 | 15 |
| | OLFINE 1010 (% by mass) | 0.5 | 0.5 | 0.5 | 0.5 | 0.5 | 0.5 | 0.5 |
| | Free resin amount (% by mass) | 0.00 | 0.04 | 0.12 | 0.24 | 0.27 | 0.30 | 0.33 |
| | Adsorbed resin proportion | 1.000 | 0.994 | 0.976 | 0.960 | 0.951 | 0.945 | 0.940 |

Examples 1 to 8

Comparative Examples 1 to 6

Forty percent by mass of the pigment dispersion of the types listed in Tables 5 and 6, 10% by mass of glycerin (humectant), 20% by mass of 1,3-propanediol (humectant), 0.6% by mass of 1,2-octanediol (high penetrating agent), 4.5% by mass of triethylene glycol monobutyl ether (penetrating agent), 5.0% by mass of 2-pyrrolidone (dissolution stabilizer), 0.5% by mass of OLFINE E1010 (surfactant, ethylene oxide adduct of acetylenediol, made by Nissin Chemical Industry Co., Ltd.) and a remainder of ion exchange water were uniformly mixed by agitating at a revolution speed of 400 rpm using an agitator (Three-One Motor BL-600 (made by AS ONE Corp.)). Thereafter, the inks of Examples 1 to 8 and Comparative Examples 1 to 6 were obtained by filtering the uniformly mixed liquid using a filter with a pore size of 5 μm.

In addition, the evaluations of the offset, image density of formed images, and recovering performance of the inks for the Examples 1 to 8 and the Comparative Examples 1 to 6 were performed according to the following methods. The evaluation results of the offset, image density of formed images, and recovering performance of the inks of Examples 1 to 10 and Comparative Examples 1 to 7 are listed in Tables 5 and 6.

Method for Evaluating Offset

Ink was filled into the recording head at the closest position to the ejection roller (corresponding to 11K in FIG. 1), and excess liquid overflowing from the nozzle-forming surface was scraped off using a wiper blade. The distance between the nozzle surface of the recording head and the recording paper P was fixed to 1 mm, and the conveying speed of the recording paper P from the paper feed part to the ejection part of the recording paper P was set to 846.7 mm/sec. Using paper made by cutting paper (IJW (made by Oji Paper Co., Ltd.)) to A4 size as the recording paper P, ten solid images of 10 cm×10 cm were continuously formed on the recording paper P under an environment of 10° C. and 80% RH by ejecting ink from the recording head so that the ejected amount of the ink onto the recording paper P would become 15 g/m². For the tenth recording paper P thus formed, the evaluation of contamination of the recording paper P caused by offset was performed according to the following method.

First, an image offset part of the recording paper P on which an image had been formed (portion in which paper contamination occurs due to ink adhered to the roller) was read by an image scanner (GT-X820 (made by Seiko Epson Corp.)), and binarization was performed at a threshold value 220 setting. The offset area ratio, which is an index of the occurrence of offset, was calculated based on the following formula from the number of black pixels and the total number of pixels in the binarized image. The degree of contamination of the recording paper P caused by offset is more intense with higher offset area ratios. Since contamination of the recording paper P caused by offset can be confirmed by visual observation when the offset area ratio exceeds 0.030, a case of the offset area ratio exceeding 0.030 was judged as NG, and the offset area ratio of 0.030 or less was judged as OK.

(Offset Area Ratio Calculation Formula)

Offset area ratio(%)=100×number of black pixels/total number of pixels

Method of Evaluating Image Density

Using plain paper (A4, PPC paper, C2 (made by Fuji Xerox Corp.)) as the recording medium, the amount of ink ejected from one nozzle of the recording head was set 11 pL and a 10 cm×10 cm solid image was formed on the plain paper. After storing the plain paper on which the image had been formed for a day and a night under an environment of normal temperature and normal humidity, the image density of the solid image was measured using a portable reflection density meter RD-19 (made by Gretag Macbeth), and the average value for the image density of image densities at ten locations in the solid image was defined as the image density. An image density of 1.0 or more was judged as OK, and an image density less than 1.0 was judged as NG.

Method of Evaluating Recovering Performance

Ink was filled into the recording head, and after performing purging and wiping on the recording head 3 times in sets, the recording head was left for one month without capping the recording head. It should be noted that the purging amount is 2 cc per time. After being left for one month, purging and wiping was performed three times on the recording head, then a check pattern that could confirm the ejection state of all nozzles of the recording head was formed (first image), and the ejection state of all nozzles were confirmed according to the following judgment criterion. At this time, in the case of a non-ejecting nozzle being confirmed, purging and wiping was performed on the recording head three times again, and then a check pattern that could confirm the ejection state of all nozzles of the recording head was formed (second image), and the ejection state of all nozzles was confirmed according to the following judgment criterion.

OK: Case in which ejection of all nozzles in second image could be confirmed.

NG: Case in which non-ejecting nozzle confirmed in second image.

TABLE 5

|  |  | Example | | | | | | | |
| --- | --- | --- | --- | --- | --- | --- | --- | --- | --- |
|  |  | 1 | 2 | 3 | 4 | 5 | 6 | 7 | 8 |
| Pigment dispersion | Type | 3 | 4 | 5 | 6 | 9 | 10 | 11 | 12 |
|  | Molecular weight of resin (MW) | 46000 | 73000 | 98000 | 139000 | 73000 | 73000 | 73000 | 73000 |
|  | Adsorbed resin proportion | 0.975 | 0.975 | 0.971 | 0.970 | 0.994 | 0.983 | 0.960 | 0.951 |
| Offset |  | 0.018 | 0.016 | 0.019 | 0.023 | 0.023 | 0.018 | 0.022 | 0.026 |
|  |  | OK | OK | OK | OK | OK | OK | OK | OK |

TABLE 5-continued

|  | Example | | | | | | | |
|---|---|---|---|---|---|---|---|---|
|  | 1 | 2 | 3 | 4 | 5 | 6 | 7 | 8 |
| Image density | 1.03 | 1.06 | 1.08 | 1.10 | 1.01 | 1.03 | 1.06 | 1.08 |
|  | OK | OK | OK | OK | OK | OK | OK | OK |
| Recovering property | OK | OK | OK | OK | OK | OK | OK | OK |

TABLE 6

|  |  | Comparative example | | | | | |
|---|---|---|---|---|---|---|---|
|  |  | 1 | 2 | 3 | 4 | 5 | 6 |
| Pigment dispersion | Type | 1 | 2 | 7 | 3 | 13 | 14 |
|  | Molecular weight of resin (MW) | 20000 | 33000 | 143000 | 73000 | 73000 | 73000 |
|  | Adsorbed resin proportion | 0.970 | 0.975 | 0.967 | 1.000 | 0.945 | 0.940 |
| Offset |  | 0.011 | 0.016 | 0.033 | 0.044 | 0.032 | 0.046 |
|  |  | OK | OK | NG | NG | NG | NG |
| Image density |  | 0.94 | 0.98 | 1.12 | 1.02 | 1.10 | 1.04 |
|  |  | NG | NG | OK | OK | OK | OK |
| Recovering property |  | OK | OK | NG | OK | NG | NG |

It is found from Tables 5 and 6 that, so long as using an ink containing resin with a molecular weight of at least 35,000 and no more than 140,000, and an adsorbed resin proportion of at least 0.95 and less than 1.00, the ejection state of ink droplets from the recording head could be easily recovered to a satisfactory state, even in a case of leaving the recording head for a long time without capping the recording head filled with ink, and the suppression of the occurrence of offset and the formation of images having a desired image density can be balanced.

Examples 9 to 14 and Comparative Examples 7 to 14

Forty percent by mass of the pigment dispersion 11, humectant of the types and amounts listed in Tables 7 and 8, 0.6% by mass of 1,2-octanediol (high penetrating agent), 4.5% by mass of triethylene glycol monobutyl ether (penetrating agent), 5.0% by mass of 2-pyrrolidone (dissolution stabilizer), 0.5% by mass of OLFINE E1010 (surfactant, ethylene oxide adduct of acetylenediol, made by Nissin Chemical Industry Co., Ltd.) and a remainder of ion exchange water were uniformly mixed by agitating at a revolution speed of 400 rpm using an agitator (Three-One Motor BL-600 (made by AS ONE Corp.)). Thereafter, the inks of Examples 9 to 14 and Comparative Examples 7 to 13 were obtained by filtering the uniformly mixed liquid using a filter with a pore size of 5 μm.

It should be noted that 1,3-propanediol may be described as PDO, and propylene glycol (1,2-propanediol) may be described as PG.

In addition, evaluations of the offset, image density and recovering performance of the inks of Examples 9 to 14 and Comparative Examples 7 to 13 were performed according to the above-mentioned methods. The evaluation results of the offset, image density and recovering performance of the inks of Examples 9 to 14 and Comparative Examples 7 to 13 are listed in Tables 7 and 8.

TABLE 7

|  |  | Example | | | | | |
|---|---|---|---|---|---|---|---|
|  |  | 9 | 10 | 11 | 12 | 13 | 14 |
| Humectant | Glycerin (% by mass) | 25 | 15 | 25 | 15 | 10 | 5 |
|  | PDO (% by mass) | 10 | 20 | 15 | 20 | 25 | 30 |
|  | PG (% by mass) | — | — | — | — | — | — |
| Offset |  | 0.027 | 0.022 | 0.020 | 0.022 | 0.018 | 0.016 |
|  |  | OK | OK | OK | OK | OK | OK |
| Image density |  | 1.04 | 1.06 | 1.06 | 1.06 | 1.04 | 1.03 |
|  |  | OK | OK | OK | OK | OK | OK |
| Recovering property |  | OK | OK | OK | OK | OK | OK |

TABLE 8

| | | Comparative example | | | | | | | |
|---|---|---|---|---|---|---|---|---|---|
| | | 7 | 8 | 9 | 10 | 11 | 12 | 13 | 14 |
| Humectant | Glycerin (% by mass) | 30 | 25 | 15 | 10 | 30 | 30 | — | 5 |
| | PDO (% by mass) | — | — | — | — | 3 | 5 | 35 | 35 |
| | PG (% by mass) | — | 10 | 15 | 20 | — | — | — | — |
| Offset | | 0.043 | 0.028 | 0.021 | 0.018 | 0.050 | 0.033 | 0.015 | 0.016 |
| | | NG | OK | OK | OK | NG | NG | OK | OK |
| Image density | | 1.05 | 1.06 | 1.05 | 1.06 | 1.08 | 1.07 | 1.02 | 1.02 |
| | | OK | OK | OK | OK | OK | OK | OK | OK |
| Recovering property | | OK | NG | NG | NG | OK | OK | NG | NG |

It is found from Tables 7 and 8 that, so long as using the inks of Examples 9 to 14 having a content of 1,3-propanediol of at least 10% by mass and no more than 30% by mass, and having a content of glycerin of at least 5% by mass, the ejection state of ink droplets from the recording head could be easily recovered to a satisfactory state, even in a case of leaving the recording head for a long time without capping the recording head filled with ink, and the suppression of the occurrence of offset and the formation of images having a desired image density can be balanced.

In addition, according to the inks of Comparative Examples 7, 11 and 12, contamination of the recording medium caused by offset tends to occur, when the content of 1,3-propanediol as humectant is no more than 10% by mass, even if the content of glycerin is at least 5% by mass.

On the other hand, it is found from the inks of Comparative Examples 13 and 14 that, in cases using ink in which the content of 1,3-propanediol as humectant is at least 30% by mass, it is difficult to recover the ejection state of ink droplets from the recording head to a satisfactory state easily. In addition, it is found from the inks of Comparative Examples 8 and 9 that, even if using an ink in which propylene glycol is used in an amount of at least 10% by mass and no more than 30% by mass in place of 1,3-propanediol, it is difficult to recover the ejection state of ink droplets from the recording head to a satisfactory state easily.

Examples 15 to 18 and Comparative Examples 15 to 27

Forty percent by mass of pigment dispersion 11, 15% by mass of glycerin (humectant), 20% by mass of 1,3-propanediol (humectant), high penetrating agent of the types and amounts listed in Tables 10 to 12, 4.5% by mass of triethylene glycol monobutyl ether (penetrating agent), 5.0% by mass of 2-pyrrolidone (dissolution stabilizer), 0.5% by mass of OLFINE E1010 (surfactant, ethylene oxide adduct of acetylenediol, made by Nissin Chemical Industry Co., Ltd.) and a remainder of ion exchange water were uniformly mixed by agitating at a revolution speed of 400 rpm using an agitator (Three-One Motor BL-600 (made by AS ONE Corp.)). Thereafter, the inks of Examples 15 to 18 and Comparative Examples 15 to 27 were obtained by filtering the uniformly mixed liquid using a filter with a pore size of 5 μm. The high penetrating agents used in Examples 15 to 18 and Comparative Examples 15 to 27 are listed in Table 9.

TABLE 9

| High penetrating agent | Compound | Carbon number |
|---|---|---|
| A | 1,2-heptanediol | 7 |
| B | 1,2-octanediol | 8 |
| C | 2-ethyl-1,3-hexanediol | 8 |
| D | 2-butyl-2-ethyl-1,3-propanediol | 9 |

In addition, evaluations for the offset, image density of formed images, and recovering performance of the inks of Examples 15 to 18 and Comparative Examples 15 to 27 were performed according to the above-mentioned methods. The evaluation results of the offset, image density, and recovering performance of the inks of Examples 15 to 18 and Comparative Examples 15 to 27 are listed in Tables 10 and 12.

TABLE 10

| Example | | 15 | 16 | 17 | 18 |
|---|---|---|---|---|---|
| High penetrating agent | Type | B | B | B | B |
| | Amount used (% by mass) | 0.2 | 0.4 | 0.6 | 0.8 |
| Offset | | 0.022 | 0.020 | 0.017 | 0.012 |
| | | OK | OK | OK | OK |
| Image density | | 1.12 | 1.10 | 1.06 | 1.03 |
| | | OK | OK | OK | OK |
| Recovering property | | OK | OK | OK | OK |

TABLE 11

| | | Comparative example | | | | | |
|---|---|---|---|---|---|---|---|
| | | 15 | 16 | 17 | 18 | 19 | 20 |
| High penetrating agent | Type | B | B | None | A | A | A |
| | Amount used (% by mass) | 0.1 | 0.9 | — | 0.5 | 1.0 | 2.0 |
| Offset | | 0.034 | 0.010 | 0.083 | 0.066 | 0.052 | 0.042 |
| | | NG | OK | NG | NG | NG | NG |
| Image density | | 1.03 | 1.01 | 0.88 | 1.08 | 1.03 | 0.96 |
| | | OK | OK | NG | OK | OK | NG |
| Recovering property | | OK | NG | OK | OK | OK | OK |

TABLE 12

| | | Comparative example | | | | | | |
|---|---|---|---|---|---|---|---|---|
| | | 21 | 22 | 23 | 24 | 25 | 26 | 27 |
| High penetrating agent | Type | C | C | C | C | C | D | D |
| | Amount used (% by mass) | 0.3 | 0.6 | 1.0 | 1.5 | 2.0 | 0.1 | 0.2 |

TABLE 12-continued

|  | Comparative example | | | | | | |
|---|---|---|---|---|---|---|---|
|  | 21 | 22 | 23 | 24 | 25 | 26 | 27 |
| Offset | 0.046 | 0.041 | 0.038 | 0.032 | 0.028 | 0.034 | 0.028 |
|  | NG | NG | NG | NG | OK | NG | OK |
| Image density | 1.03 | 1.10 | 1.04 | 1.01 | 0.97 | 1.08 | 1.02 |
|  | OK | OK | OK | OK | NG | OK | OK |
| Recovering property | OK | OK | OK | OK | OK | OK | NG |

It is found from Tables 10 to 12 that, so long as using the inks of Examples 15 to 18 containing at least 0.2% by mass and no more than 0.8% by mass of 1,2-octanediol as the high penetrating agent in the ink, the ejection state of ink droplets from the recording head could be easily recovered to a satisfactory state, even in a case of leaving the recording head for a long time without capping the recording head filled with ink, and the suppression of the occurrence of offset and the formation of images having a desired image density can be balanced.

In addition, it is found from the inks of Comparative Examples 15 and 17 that, in cases using inks having a content of 1,2-octanediol less than 0.2% by mass, since the penetrability of the ink into the recording medium cannot be sufficiently raised, contamination of the recording medium caused by offset tends to occur. Then, it is found from the ink of Comparative Example 17 that, in a case of using ink in which high penetrating agent is not used, it is further difficult to form an image having a desired image density. On the other hand, it is found from the ink of Comparative Example 16 that, in a case of using ink having a content of 1,2-octanediol exceeding 0.8% by mass, it is difficult to recover the ejection state of ink from the recording head to a state prior to being left, even if performing a recovery operation of carrying out purging and wiping on the recording head.

In addition, it is found from the inks of Comparative Examples 21 and 22 that, in cases using ink in which octanediol(2-ethyl-1,3-hexanediol), which has different substitution positions of hydroxyl groups than 1,2-octanediol, is used as the high penetrating agent, with the content thereof being at least 0.2% by mass and no more than 0.8% by mass, since the penetrability of the ink into the recording medium cannot be sufficiently raised, contamination of the recording medium caused by offset tends to occur.

On the other hand, it is found from the inks of Comparative Examples 23 to 25 that, in a case of using ink in which 2-ethyl-1,3-hexanediol is used as the high penetrating agent, although contamination of the recording medium caused by offset is not suppressed even if increasing the content thereof to about 1.5% by mass, suppression is possible by setting the content thereof to at least 2.0% by mass. However, in a case of using ink including 2-ethyl-1,3-hexanediol with a content of at least 2.0% by mass in the ink, it is found that it is difficult to form an image having a desired image density.

In addition, it is found from the inks of Comparative Examples 18 to 20 that, in cases using ink in which an alkanediol(1,2-heptanediol) having 7 carbon atoms is used as the high penetrating agent, the suppression of the occurrence of offset and the formation of images having a desired image density cannot be balanced, even if the content thereof is at least 0.2% by mass and no more than 0.8% by mass.

In addition, it is found from the ink of Comparative Example 26, in a case of using ink in which an alkanediol(2-butyl-2-ethyl-1,3-propanediol) having nine carbon atoms is used as the high penetrating agent, since the penetrability of the ink into the recording medium cannot be sufficiently raised, contamination of the recording medium caused by offset tends to occur when the content thereof is less than 0.2% by mass. According to the ink of Comparative Example 27, in a case of using ink having a content thereof that is at least 0.2% by mass and no more than 0.8% by mass, even if it is possible to balance the suppression of the occurrence of offset and the formation of images having a desired image density, the melting point of 2-butyl-2-ethyl-1,3-propanediol is high and the solubility thereof in water is low; therefore, the high penetrating agent in the ink tends to solidify inside of the recording head in the case of leaving for a long time without capping the recording head filled with ink. For this reason, in the case of using ink in which an alkanediol(2-butyl-2-ethyl-1,3-propanediol) having nine carbon atoms is used as the high penetrating agent, it is found that it is difficult to recover the ejection state of ink from the recording head to the state prior to being left, even if performing a recovery operation of carrying out purging and wiping on the recording head.

Reference Examples 2 to 15 and Comparative Examples 28 to 32

Forty percent by mass of pigment dispersion 11, 10% by mass of glycerin (humectant), 20% by mass of 1,3-propanediol (humectant), 0.6% by mass of 1,2-octanediol (high penetrating agent), penetrating agents of the types and amounts listed in Tables 14 to 17, 5.0% by mass of 2-pyrrolidone (dissolution stabilizer), 0.5% by mass of OLFINE E1010 (surfactant, ethylene oxide adduct of acetylenediol, made by Nissin Chemical Industry Co., Ltd.) and a remainder of ion exchange water were uniformly mixed by agitating at a revolution speed of 400 rpm using an agitator (Three-One Motor BL-600 (made by AS ONE Corp.)). Thereafter, the inks of Reference Examples 2 to 15 and Comparative Examples 28 to 32 were obtained by filtering the uniformly mixed liquid using a filter with a pore size of 5 μm. With the inks of Reference Examples 2 to 15 and Comparative Examples 28 to 32, penetrating agents E to H, which are the C1-C4 monoalkyl ethers of polyhydric alcohols listed in Table 13, were used. The symbols listed in Table 13 indicate the following compounds. In addition, Table 13 shows the carbon number of the alkyl group forming the alkyl ether groups of penetrating agents E to H.

TEGMBE: triethylene glycol monobutyl ether

DEGMPE: diethylene glycol monopropyl ether

TEGMEE: triethylene glycol monoethyl ether

TEGMME: triethylene glycol monomethyl ether

TABLE 13

| Penetrating agent | Compound | Carbon number of alkyl goup |
|---|---|---|
| E | TEGMBE | 4 |
| F | DEGMPE | 3 |
| G | TEGMEE | 2 |
| H | TEGMME | 1 |

In addition, evaluations of the offset, image density and recovering performance of the inks of Reference Examples 2 to 15 and Comparative Examples 28 to 32 were performed according to the above-mentioned methods. The evaluation results of the offset, image density and recovering performance of the inks of Reference Examples 2 to 15 and Comparative Examples 28 to 32 are listed in Tables 14 to 17.

TABLE 14

| Reference example | | 2 | 3 | 4 | 5 |
|---|---|---|---|---|---|
| Penetrating agent | Type | E | E | E | E |
| | Amount used (% by mass) | 1.0 | 2.0 | 5.0 | 6.0 |
| Offset | | 0.033 NG | 0.020 OK | 0.017 OK | 0.018 OK |
| Image density | | 1.05 OK | 1.04 OK | 1.01 OK | 0.96 NG |
| Recovering property | | OK | OK | OK | OK |

TABLE 15

| Reference example | | 6 | 7 | 8 | 9 | 10 |
|---|---|---|---|---|---|---|
| Penetrating agent | Type | F | F | F | F | F |
| | Amount used (% by mass) | 1.0 | 2.0 | 5.0 | 6.0 | 7.0 |
| Offset | | 0.036 NG | 0.026 OK | 0.020 OK | 0.016 OK | 0.014 OK |
| Image density | | 1.05 OK | 1.04 OK | 1.03 OK | 1.01 OK | 0.98 NG |
| Recovering property | | OK | OK | OK | OK | OK |

TABLE 16

| Reference example | | 11 | 12 | 13 | 14 | 15 |
|---|---|---|---|---|---|---|
| Penetrating agent | Type | G | G | G | G | G |
| | Amount used (% by mass) | 1.0 | 2.0 | 5.0 | 6.0 | 7.0 |
| Offset | | 0.038 NG | 0.029 OK | 0.025 OK | 0.022 OK | 0.018 OK |
| Image density | | 1.06 OK | 1.05 OK | 1.02 OK | 1.00 OK | 0.96 NG |
| Recovering property | | OK | OK | OK | OK | OK |

TABLE 17

| Comparative example | | 28 | 29 | 30 | 31 | 32 |
|---|---|---|---|---|---|---|
| Penetrating agent | Type | None | H | H | H | H |
| | Amount used (% by mass) | — | 1.0 | 2.0 | 5.0 | 6.0 |
| Offset | | 0.083 NG | 0.044 NG | 0.030 NG | 0.028 OK | 0.022 OK |
| Image density | | 0.88 NG | 1.05 OK | 1.02 OK | 0.98 NG | 0.95 NG |
| Recovering property | | OK | OK | OK | OK | OK |

It is found from Tables 14 to 17 that, if using the inks of Reference Examples 3 and 4 containing at least 2% by mass and no more than 5% by mass of triethylene glycol monobutyl ether as the penetrating agent in the ink, as well as the inks of Reference Examples 7 to 9 and 12 to 14 containing at least 2% by mass and no more than 6% by mass of diethylene glycol monopropyl ether or triethylene glycol monoethyl ether, the ejection state of ink droplets from the recording head could be easily recovered to a satisfactory state, even in a case of leaving for a long time without capping the recording head filled with ink, and the suppression of the occurrence of offset and the formation of images having a desired image density can be balanced.

It is found from the inks of Reference Examples 2, 6 and 11 and Comparative Example 28 that, in cases using inks having a content of C2-C4 monoalkyl ether of a polyhydric alcohol less than 2% by mass, contamination of the recording medium caused by offset tends to occur due to it being difficult for the recording medium to be wetted by the ink, and thus difficult for the ink to permeate the recording medium. Then, it is found from the ink of Comparative Example 28 that, in a case of using ink in which a penetrating agent is not used, it is further difficult to form images having a desired image density. On the other hand, according to the inks of Reference Examples 5, 10 and 15, in cases using ink having a content of C2-C4 monoalkyl ether of a polyhydric alcohol that is excessive, since the penetrability of the ink into the recording medium will become too high, the pigment will tend to penetrate inside of the recording medium along with the liquid component of the ink. For this reason, when using ink containing an abundance of penetrating agent, it will be difficult to form images having a desire image density.

It is found from the inks of Comparative Examples 29 to 32 that, in cases using ink in which triethylene glycol monomethyl ether is used as the penetrating agent, the suppression of the occurrence of offset and the formation of images having a desired image density cannot be balanced, even if the content thereof is at least 2% by mass and no more than 5% by mass.

Examples 19 to 23 and Comparative Examples 33 to 37

Pigment dispersion 12 (adsorbed resin proportion: 0.951) or pigment dispersion 14 (adsorbed resin proportion: 0.940), glycerin (humectant), 1,3-propanediol (humectant), 1,2-octanediol (high penetrating agent), triethylene glycol monobutyl ether (penetrating agent, TEGMBE), 2-pyrrolidone (dissolution stabilizer), OLFINE E1010 (surfactant, ethylene oxide adduct of acetylenediol, made by Nissin Chemical Industry Co., Ltd.) and a remainder of ion exchange water were uniformly mixed in the proportions listed in Tables 18 and 19, by agitating at a revolution speed of 400 rpm using an agitator (Three-One Motor BL-600 (made by AS ONE Corp.)). Thereafter, the inks of Examples 19 to 23 and Comparative Examples 33 to 37 were obtained by filtering the uniformly mixed liquid using a filter with a pore size of 5 μm.

In addition, evaluations for the offset, image density of formed images, and recovering performance of the inks of Examples 19 to 23 and Comparative Examples 33 to 37 were performed according to the above-mentioned methods. The evaluation results of the offset, image density, and recovering performance of the inks of Examples 19 to 23 and Comparative Examples 33 to 37 are listed in Tables 18 and 19. In addition, the pigment content contained in the inks of Examples 19 to 23 and Comparative Examples 33 to 37, and the adsorbed resin proportion all obtained according to the method of measuring the adsorbed resin proportion described in Reference Example 1 are noted in Tables 18 and 19.

TABLE 18

| Example | | 19 | 20 | 21 | 22 | 23 |
|---|---|---|---|---|---|---|
| Composition (% by mass) | Pigment dispersion 12 | 26.7 | 40.0 | 53.3 | 60.0 | 63.3 |
| | TEGMBE | 4.5 | 4.5 | 4.5 | 4.5 | 4.5 |
| | 2-pyrrolidone | 5.0 | 5.0 | 5.0 | 5.0 | 5.0 |
| | OLFINE 1010 | 0.5 | 0.5 | 0.5 | 0.5 | 0.5 |
| | 1,2-octanediol | 0.6 | 0.6 | 0.6 | 0.6 | 0.6 |
| | Glycerin | 20 | 10 | 10 | 7 | 7 |
| | 1,3-propanediol | 20 | 20 | 18 | 15 | 13 |
| Pigment content (% by mass) | | 4.0 | 6.0 | 8.0 | 9.0 | 9.5 |

TABLE 18-continued

| Example | 19 | 20 | 21 | 22 | 23 |
|---|---|---|---|---|---|
| Resin content (% by mass) | 1.47 | 2.20 | 2.93 | 3.30 | 3.48 |
| Free resin content (% by mass) | 0.073 | 0.108 | 0.144 | 0.162 | 0.172 |
| Adsorbed resin proportion | 0.951 | 0.951 | 0.951 | 0.951 | 0.951 |
| Offset | 0.021 OK | 0.024 OK | 0.026 OK | 0.028 OK | 0.029 OK |
| Image density | 1.02 OK | 1.06 OK | 1.08 OK | 1.10 OK | 1.11 OK |
| Recovering property | OK | OK | OK | OK | OK |

TABLE 19

| Comparative example | | | 33 | 34 | 35 | 36 | 37 |
|---|---|---|---|---|---|---|---|
| Composition (% by mass) | Pigment dispersion | Type | 12 | 14 | 14 | 14 | 14 |
| | | Amount used | 66.7 | 26.7 | 40.0 | 53.3 | 60.0 |
| | TEGMBE | | 4.5 | 4.5 | 4.5 | 4.5 | 4.5 |
| | 2-pyrrolidone | | 5.0 | 5.0 | 5.0 | 5.0 | 5.0 |
| | OLFINE 1010 | | 0.5 | 0.5 | 0.5 | 0.5 | 0.5 |
| | 1,2-octanediol | | 0.6 | 0.6 | 0.6 | 0.6 | 0.6 |
| | Glycerin | | 6 | 20 | 10 | 10 | 7 |
| | 1,3-propanediol | | 10 | 20 | 20 | 18 | 15 |
| Pigment content (% by mass) | | | 10.0 | 4.0 | 6.0 | 8.0 | 9.0 |
| Resin content (% by mass) | | | 3.67 | 1.47 | 2.20 | 2.93 | 3.30 |
| Free resin content (% by mass) | | | 0.180 | 0.089 | 0.132 | 0.176 | 0.198 |
| Adsorbed resin proportion | | | 0.951 | 0.940 | 0.940 | 0.940 | 0.940 |
| Offset | | | 0.033 NG | 0.032 NG | 0.036 NG | 0.039 NG | 0.042 NG |
| Image density | | | 1.03 OK | 1.02 OK | 1.06 OK | 1.08 OK | 1.10 OK |
| Recovering property | | | NG | OK | OK | OK | OK |

It is found from Tables 18 and 19 that, in cases using the inks of Examples 19 to 23 having a content of pigment in the ink of at least 4% by mass and no more than 9.5% by mass, and an adsorbed resin proportion of at least 0.95 and less than 1.00, the ejection state of ink droplets from the recording head could be easily recovered to a satisfactory state, even in a case of leaving for a long time without capping the recording head filled with ink, and the suppression of the occurrence of offset and the formation of images having a desired image density can be balanced.

On the other hand, it is found that, in the cases using the inks of Comparative Examples 34 to 37 having an adsorbed resin proportion less than 0.95, even if the content of pigment in the ink is at least 4% by mass and no more than 9.5% by mass, it becomes difficult to suppress the occurrence of offset due to penetration of ink droplets into the recording medium tending to be prevented from by the free resin in the ink increasing.

The invention claimed is:

1. An ink for inkjet recording apparatuses comprising at least water, a pigment dispersion, a high penetrating agent, a penetrating agent and a humectant, wherein
the pigment dispersion contains a resin having a molecular weight in the range of 35,000 to 140,000 and a pigment,
an adsorbed resin proportion, obtained using the following formula from the mass of a total amount of the resin in the ink and an amount of resin separated from pigment among the resin, is at least 0.95 and less than 1.00:

adsorbed resin proportion=1−(free resin mass/total resin mass), the content of the pigment in the ink is in the range of 4% by mass to 9.5% by mass,
the humectant is glycerin and 1,3-propanediol,
the content of glycerin in the ink is at least 5% by mass, and the content of 1,3-propanediol is in the range of 10% by mass to 30% by mass,
the high penetrating agent is 1,2-octanediol,
the content of the high penetrating agent in the ink is in the range of 0.2% by mass to 0.8% by mass, and
the penetrating agent is a C2-C4 monoalkyl ether of a polyhydric alcohol.

2. The ink for inkjet recording apparatuses according to claim 1, wherein the C2-C4 monoalkyl ether of a polyhydric alcohol is triethylene glycol monobutyl ether, and the content thereof in the ink is in the range of 2% by mass to 5% by mass.

3. The ink for inkjet recording apparatuses according to claim 1, wherein
the C2-C4 monoalkyl ether of a polyhydric alcohol is at least one selected from the group consisting of diethylene glycol monopropyl ether and triethylene glycol monoethyl ether, and the content of the penetrating agent in the ink is in the range of 2% by mass to 6% by mass.

4. A method for forming an image, comprising forming an image using an inkjet recording apparatus using the ink for inkjet recording apparatuses according to claim 1.

5. The method for forming an image according to claim 4, wherein a time from when a droplet of the ink for ink jet recording apparatuses lands on a recording medium, until a location of the landing on the recording medium reaches an ejection part that ejects the recording medium in the inkjet recording apparatus is within 1 second.

6. The method for forming an image according to claim 4, wherein the inkjet recording apparatus is a recording apparatus that includes a long line head arranged in a perpendicular direction to a direction in which recording medium is conveyed.

* * * * *